Dec. 2, 1952     A. ELLETT     2,619,873
MOTION-PICTURE FILM RECORDING APPARATUS
Filed Aug. 24, 1949     3 Sheets-Sheet 1
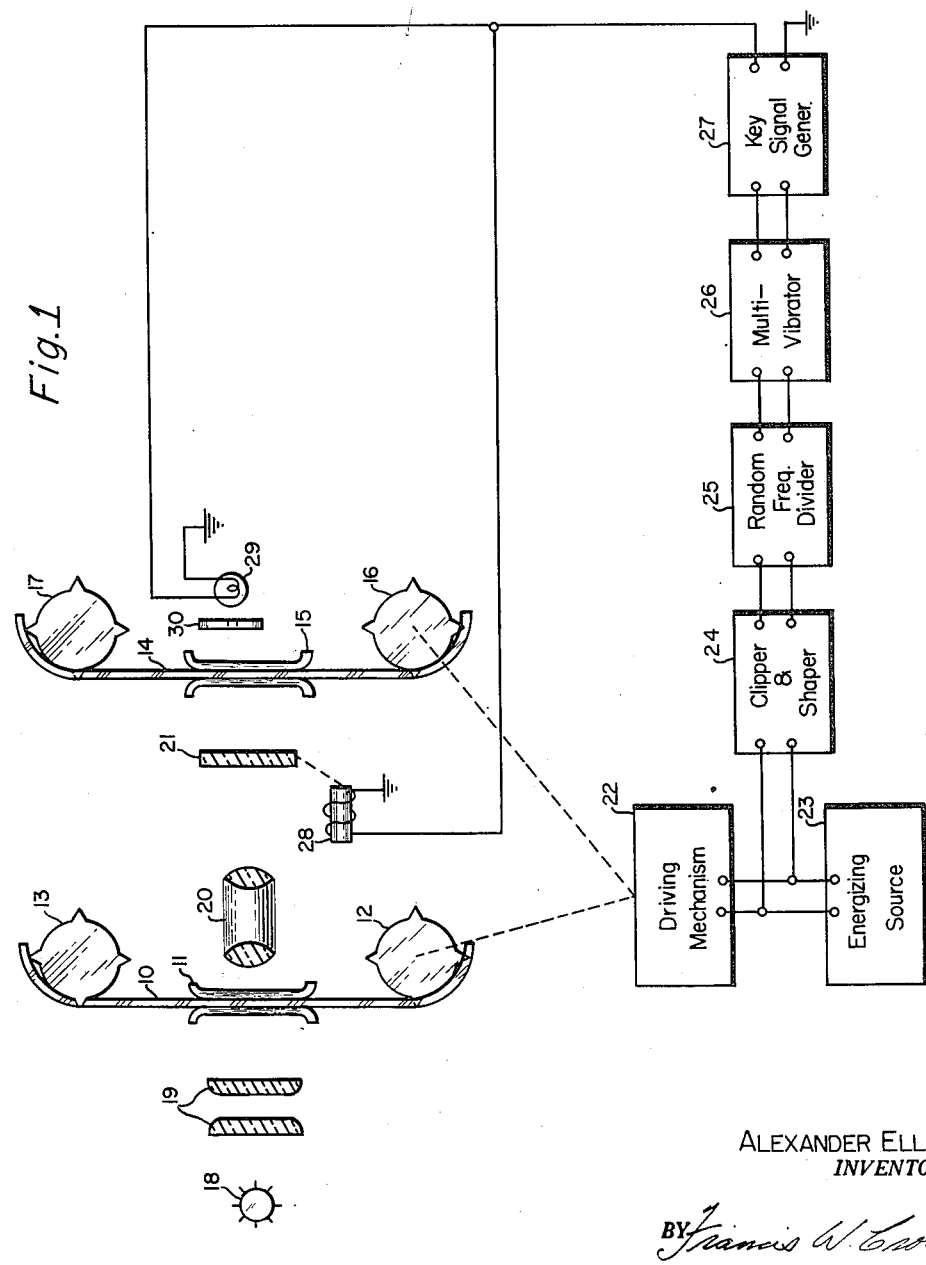
ALEXANDER ELLETT
*INVENTOR.*
BY
HIS ATTORNEY Dec. 2, 1952  A. ELLETT  2,619,873
MOTION-PICTURE FILM RECORDING APPARATUS
Filed Aug. 24, 1949  3 Sheets-Sheet 2
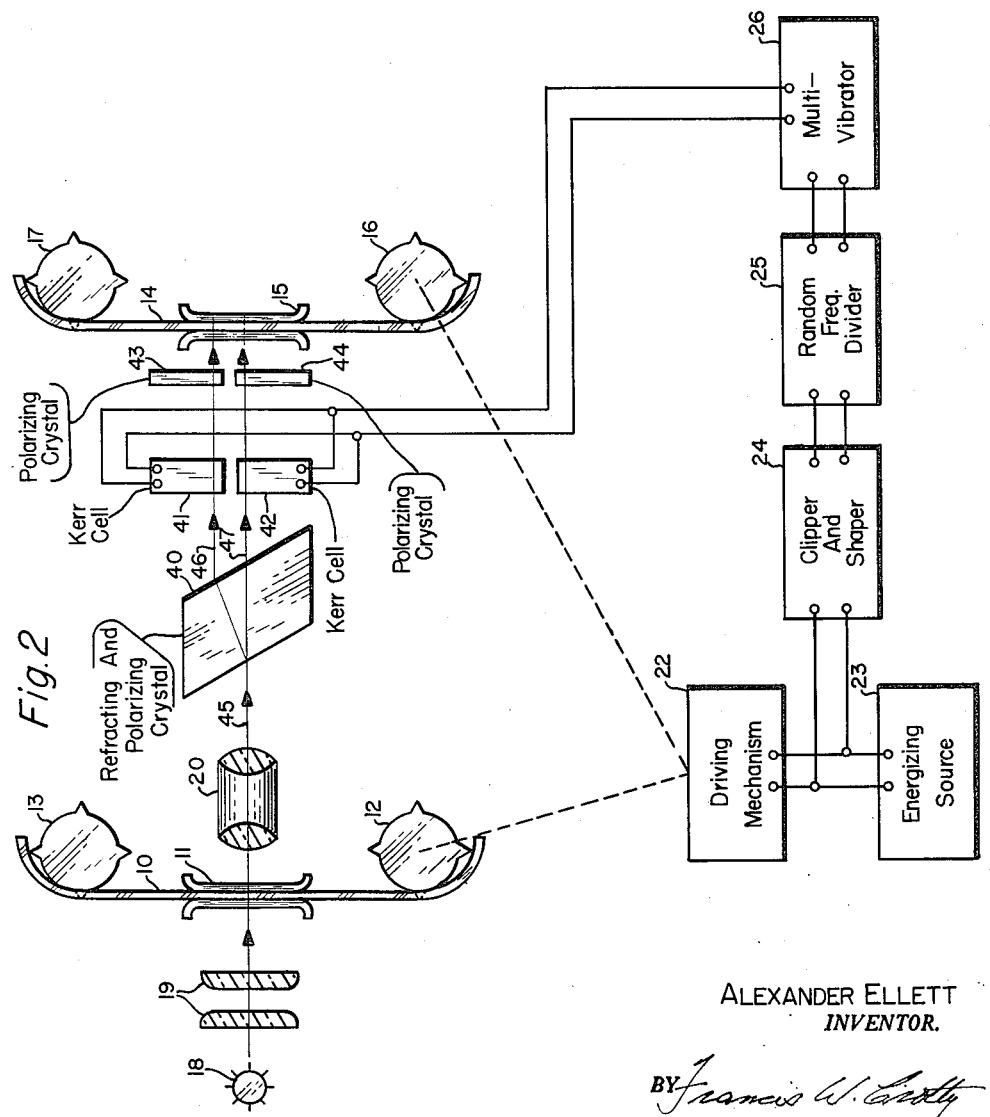
ALEXANDER ELLETT
INVENTOR.
BY
HIS ATTORNEY

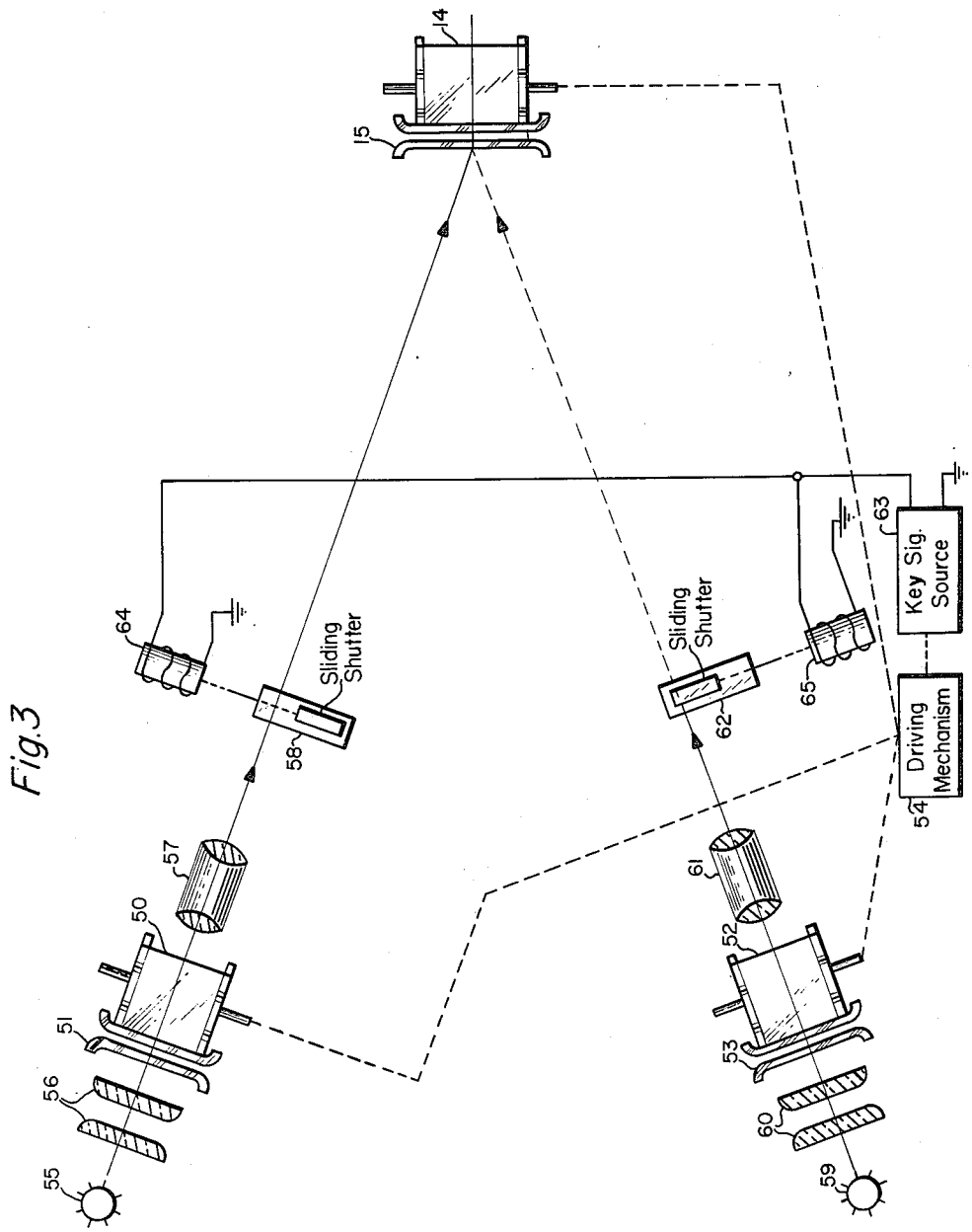

Patented Dec. 2, 1952

2,619,873

UNITED STATES PATENT OFFICE 2,619,873

MOTION-PICTURE FILM RECORDING APPARATUS

Alexander Ellett, River Forest, Ill., assignor to Zenith Radio Corporation, a corporation of Illinois Application August 24, 1949, Serial No. 112,111

12 Claims. (Cl. 88—24)

The present invention relates generally to apparatus for recording images on a motion-picture film in coded form.

Coded motion-picture films for use in subscriber television systems have been previously disclosed in copending application Serial No. 73,379 to Ted Leitzell entitled "Coded Cinematic Films," filed January 28, 1949; and in copending application Serial No. 84,986, filed April 1, 1949, Alexander Ellett, entitled "Cinematic Films For Subscription Television Systems," both of which are assigned to the present assignee. These applications disclose film strips on which images are recorded in one mode in groups of film-frames spaced along the strip, and in another mode in different groups of film-frames spaced along the strip and interspersed between the first-mentioned groups. In this manner, the film strip presents a series of successive film-frames on which the images are recorded first in one mode and then in another.

The expression "recorded in one mode" is intended to mean that the images are recorded so that any given point of a particular subject occupies the identical position in succeeding film-frames of the group and has in each frame the same shade value, assuming that there is no modification of the subject as between the several frames in the group. On the other hand, "recorded in another mode" is intended to mean that, although the program information is recorded in succeeding frames in the group so that any given point of a particular subject occupies the identical position and has the same shade value in each frame, there is an alteration between the position or shade value of the given point in the frames of the group recorded in this latter mode relative to the position or shade value of the same point in the frames of the previous group. This alteration may, for example, take the form of a lateral displacement, a vertical displacement, an inversion of top to bottom, a black-and-white inversion, and so on.

The present invention is directed to apparatus for recording images on sensitized films in coded form to produce coded motion-picture films such as those disclosed in the afore-mentioned applications. This coding is accomplished, as previously stated, by recording the images in one mode on a series of film-frames and by recording these images in a distinctly different mode on another series of film-frames interspersed with the frames of the first series.

It is, therefore, an object of this invention to provide improved apparatus for recording images on succeeding frames of a sensitized film, by means of which these images are recorded on the film in a plurality of separate and distinct modes to provide a coded film record.

Another object of this invention is to provide such apparatus for recording images on the film in a plurality of separate modes, and for further recording key-signal markings on a selected track or portion of the film at the edge thereof to indicate the changes in mode of the recorded information.

The features of this invention which are believed to be new are set forth with particularity in the appended claims. The invention itself, however, together with further objects and advantages thereof may best be understood by reference to the following drawings, in which:

Figure 1 shows one embodiment of the invention.

Figure 2 shows a second embodiment of the invention, and

Figure 3 shows a third embodiment of the invention.

Figure 1 shows one type of system that may be utilized for recording images on a sensitized motion-picture film in coded form. In this system a film 10 is drawn through a film gate 11 by means of a driving sprocket 12 acting in conjunction with an idler sprocket 13. The film 10 is in all ways similar to films widely used in motion-picture projectors and has images recorded thereon in successive film-frames and in uncoded form. The film 10 constitutes the image source for the present embodiment of the invention, and this embodiment provides a system for transferring the uncoded images from the film 10 to a sensitized film 14 whereon they are developed in successive film-frames and coded in a manner to be described.

The sensitized film 14 is drawn through a film gate 15 by means of a driving sprocket 16 acting in conjunction with an idler sprocket 17. Light rays from a light source 18 are directed through a condenser lens system 19 onto the exposure area of the film 10 defined by the gate 11. In this manner, the images recorded on the developed film 10 are projected through a further lens system 20 and coding means 21 onto the exposure area of the sensitized film 14 defined by the gate 15.

The coding means 21, in the present embodiment, is a transparent refractive plate pivotally supported across the optical path which extends from the film gate 11 to the film gate 15. The light source 18 in the present system is assumed to be of the intermittent type, and is synchronized with the films 10 and 14 so that successive image frames of the film 10 are projected onto the sensitized film 14. Of course, when so desired, the light source 18 may be of the continuous type and a properly synchronized shutter may be provided in the afore-mentioned optical path.

A driving mechanism 22 of any suitable type is utilized to drive the sprockets 12 and 16 so that the films 10 and 14 are drawn through their respective film gates 11 and 15 in synchronism one with the other. The driving mechanism 22 is electrically energized by any suitable source 23 which generates, preferably, a sine wave. This sine wave is also supplied to a clipper and shaper unit 24 wherein it is clipped and shaped into pulses of a single polarity having a repetition frequency equal to the frequency of the sine wave. The pulses from the unit 24 are supplied to a random frequency divider 25 which may be of the type disclosed in copending application Serial No. 32,457, Roschke, filed June 11, 1948, entitled "Random-Frequency Divider," now U. S. Patent No. 2,588,413, dated March 11, 1952, and assigned to the present assignee.

The random-divided frequency pulses from frequency divider 25 are applied to the input or control circuit of a multivibrator 26. The multivibrator 26 is of the single-shot type, that is, a multivabrator or trigger circuit in which one applied control pulse conditions the unit in one sense, whereas the next succeeding pulse conditions the unit in the opposite sense. The multivibrator produces, therefore, at its output terminals a signal of rectangular wave form in which amplitude changes between the maximum and minimum values occur in accordance with the controlling pulses supplied by the frequency divider 25.

The output signal of the multivibrator 26 is supplied to a key-signal generator 27 to control this generator so that it oscillates and generates a burst of key signal solely during intervals when the signal from the multivibrator is in a predetermined one of its two conditions. Thus, the key-signal generator 27, acting under the control of the multivibrator 26, generates bursts of key signal at random intervals and of random duration. These key-signal bursts are supplied to solenoid 28 to energize this solenoid during the intervals and for the duration of each individual burst. Energization of the solenoid 28 causes the plate 21 to pivot on an axis parallel to the path of film travel from a substantially perpendicular position across the aforementioned optical path wherein the light rays are passed thereby with substantially no refraction, to an oblique position across the path wherein the light rays are refracted and hence displaced a certain amount in a predetermined direction. At the termination of each burst, the plate 21 may be returned to its original perpendicular position across the optical path by an ordinary tension spring, not shown.

The sensitized film 14 is given sufficient surface area so that the images recorded on the film 10 in succeeding uncoded image frames may be recorded on the sensitized film when the plate 21 is in either of its afore-described positions. Therefore, when solenoid 28 is de-energized the plate 21 is in a position to direct the images from the film 10 to a certain position on the exposure area of the sensitized film 14 within the film gate 15, wherein they are recorded on succeeding film-frames of the sensitized film in a first mode. On the other hand, when the solenoid 28 is energized, the plate 21 is moved to a second position to direct the images from the film 10 to a position within the film gate 15 displaced from their previous position whereby they are recorded on succeeding film-frames of the sensitized film 14 in a second mode.

In this manner, the images recorded on the film 10 in successive uncoded image-frames may be recorded on the sensitized film 14 in successive coded image-frames. In the described system, coding of the image-frames on the sensitized film 14 is accomplished by recording information on its successive film-frames in either of two modes by having the record change from mode to mode in accordance with a desired coding schedule. One mode contemplates recording the images in a given area of a film-frame, whereas in the second mode the images are recorded in a different area of a film frame, this latter area being displaced sidewise or lengthwise of the film-frame relative to the first mentioned area, depending on the position of the first axis of the plate 21. The first-mode position of the images recorded on the sensitized film 14 occurs when the solenoid 28 is de-energized and the plate 21 has a first position across the optical path; and the second-mode position of the recorded images occurs during the spaced intervals in which the solenoid 28 is energized by the key signal bursts from generator 27, and the plate 21 has a second position across the optical path.

The key-signal generator 27 is synchronized with the driving mechanism 22 so that the initiation and termination of each burst of key signal and, hence, the change in mode of the images recorded on the sensitized film 14, may be made to occur during the intervals between successive film-frames, during which intervals the intermittent light source 18 is de-energized. Therefore, changes in mode are always made to occur between succeeding film-frames, and distortion that would otherwise be caused is thereby avoided.

The key-signal generator 27 is also connected to a light source 29 comprising a highly sensitized device which transforms variations in the key signal bursts from generator 27 into corresponding light variations. The light rays from the source 29 are directed through a shutter 30 onto a track at the edge of the film 14. The light variations from the source 29 which occur in response to the applied key signal cause key signal markings representing the key-signal bursts to be recorded on the film. Since these key-signal bursts occur only during spaced intervals in which the images are recorded on the sensitized film 14 in a particular one of the modes, the key-signal markings recorded in bursts along the film track serve to identify the film-frames conveying the recorded images in this particular mode.

As pointed out in the aforementioned application, Serial No. 84,986, the bursts of key-signal markings may be displaced a certain amount along the track relative to the corresponding film-frames of the mode that these bursts are intended to indicate. The relative positions of the key-signal markings and the film-frames they designate may be established by shifting the shutter 30 parallel to the direction of motion of the film 14 by the desired amount.

The coding means 21 may be of any desired form and pivoted on any desired axis to displace the relative position of the images recorded in the first mode and those recorded in the second mode on the sensitized film 14 vertically, laterally, or in any other direction. Moreover, this coding means may take the form of a lens system which, upon actuation of a movable member, acts to invert the images recorded in the second mode relative to those recorded in the first mode. In addition, the image source need not be the film 10 but images may be directed onto the sensitized film 14 from the actual scene to be photographed, a suitable shutter being provided so that these images may be recorded on the sensitized film in successive film-frames, and suitable coding means being provided so that the recording process is effected in a plurality of distinct modes.

A second embodiment of the invention is shown in Figure 2 in which coding means is provided in the optical path between the film gate 11 of the uncoded film 10 and the film gate 15 of the sensitized film 14. This embodiment is similar to the system of Figure 1 in many respects, but differs in that the coding means herein enables the images from the film 10 to be recorded on the sensitized film 14 in separate and distinct modes without the need of a movable element in the coding means, such as was the case of the embodiment of Figure 1.

The coding means of the system of Figure 2 comprises a refracting and polarizing crystal 40, a pair of Kerr cells 41 and 42, and a pair of polarizing crystals 43 and 44. The crystal 40 may be formed of calcite or other suitable substance that has the property of dividing a light ray 45 directed thereto into a pair of displaced and parallel polarized light rays 46 and 47. The Kerr cells 41 and 42 have the well-known property of changing the plane of polarization of the rays 46 and 47 when an electrical potential is applied to their respective terminals. The polarizing crystals 43 and 44 may be so oriented that, in the absence of a potential on the terminals of the Kerr cells 41 and 42, the crystal 43 passes the polarized light ray 46 to the exposure area of the sensitized film 14 as defined by the film gate 15, and the crystal 44 blocks the polarized light ray 47. However, in the presence of a potential across the terminals of the cells 43 and 44, the orientation of the crystals is such that the crystal 43 blocks the polarized light ray 46 and the crystal 44 passes the polarized light ray 47 to the exposure area of the film 14.

The pulse output of the multivibrator 26 is applied directly to the terminals of the Kerr cells 41 and 42. Hence, positive polarity pulses are applied to the cells 41 and 42, and for the duration of each of these pulses the crystal 44 passes the polarized light ray 47 to the exposure area of the film 14 and the crystal 43 blocks the light ray 46. Moreover, during the intervals between the individual pulses, the crystal 43 passes the light ray 46 to the exposure area and the crystal 44 blocks the light ray 47.

In this manner, images projected from the film 10 are recorded in successive film frames on the sensitized film 14 in two separate modes. These images are recorded on the successive film frames in a first mode when the multivibrator 21 is in a predetermined one of its conditions, and in a second mode wherein the film frames have a position displaced from the first mode film frames when the multivibrator is in a second of its conditions. The displacement between the first mode film frames and the second mode film frames may be made vertical, lateral, or any other desired angle by appropriate arrangement of the coding means. As in the previous embodiment, the multivibrator 26 may be coupled to a key signal generator to enable key signal markings representing a predetermined one of the two modes to be recorded on the film 14.

A third embodiment of the invention is shown in Figure 3. In this embodiment there are two sources of the images to be recorded on the sensitized film 14 in coded form. The first image source is represented by the film 50 which is adapted to be drawn through a film gate 51, and the second image source is represented by a film 52 adapted to be drawn through a film gate 53. The images recorded on the film 50 are recorded thereon in a single mode, and the images recorded on the film 52 are recorded thereon in a single mode but different from the mode of the images on the film 50. For example, the film 50 may be a positive representation of the images and the film 52 may be a negative representation thereof; the images on the two films representing a black-and-white inversion relative to each other. However, the images on the films 50 and 52 are in all other respects identical, and these films are drawn through their respective film gates 51 and 53 in synchronism one with the other by a common driving mechanism 54.

The light rays from a properly synchronized intermittent light source 55 are projected onto the film area defined by the film gate 51 through a condenser lens 56 and, thence, through a a further lens system 57 and a sliding-shutter arrangement 58 to the exposure area of the sensitized film 14 as defined by the film gate 15. In addition, the light rays from a properly synchronized intermittent light source 59 are projected onto the film area defined by the film gate 53 through a condenser lens 60 and, thence, through a further lens system 61 and sliding-shutter arrangement 62 to the exposure area of the sensitized film 14 as defined by the film gate 15.

A key signal source is indicated 63, and this source may take the form of a magnetic tape synchronized with the driving mechanism 54 and having the key signal recorded thereon in accordance with a certain predetermined schedule. The shutters 58 and 62 are actuated respectively by solenoids 64 and 65, the solenoid 64 acting to move the shutter 58 so that it blocks the light path from the film gate 53 to the film gate 15 when this solenoid is energized; and the solenoid 65 acting to move the shutter 62 so that it unblocks the light path from the film gate 53 to the film gate 15 when this latter solenoid is energized. The shutters 58 and 62 may be returned to their original positions when the solenoids 64 and 65 are de-energized by means of ordinary tension springs, not shown.

The key signal from the source 63 may be in the form of bursts occurring at random intervals and for random individual durations. During the occurrence of the individual bursts, the solenoids 64 and 65 are simultaneously energized and the images from the film 52 are projected onto the sensitized film 14; and during the intervals between the individual bursts, the solenoids 64 and 65 are de-energized and the images from the film 50 are projected onto the sensitized film 14. In this manner, images from the films 50 and 52 are alternately projected onto the film 14, the alteration being controlled by the key signal from source 63. Hence, the images recorded on the film 14 are recorded in two distinct modes in successive groups of film frames, the second mode film frames having a black-and-white inversion relative to the first mode film frames.

When so desired, the recording process of the sensitized film 14 may be effected in two separate steps. The shutter 62 may be disabled in a closed position and the film 50 operated in conjunction with its shutter 58 (actuated by the synchronized key signal source 63) to record only the first mode film frames on the film 14. When this operation is completed the shutter 58 may be disabled in a closed position and the film 52 operated in conjunction with its shutter 62 (actuated by the identical key signal schedule from the synchronized key signal source 63) to record the second mode film frames interspersed with the already-recorded first mode film frames. When desired, the key signal source 63 may be connected to actuate alternately the intermittent light sources 55 and 59, and with this connection the shutters 58 and 62 and their associated mechanism may be dispensed with. Of course, the mode differentiation between the films 50 and 52 need not necessarily be a black-and-white inversion, but can be any other desired type, such as top and bottom inversion, left and right inversion, and so on.

Therefore, while particular embodiments of the invention have been shown and described modifications may be made, and it is intended in the appended claims to cover all such modifications as fall within the true spirit and scope of the invention.

I claim:

1. Apparatus for recording images on a sensitized film strip in coded form comprising: a film gate defining an exposure area of said sensitized film; means for drawing said sensitized film strip across said film gate; optical means for projecting images from image source means onto said exposure area; a driving mechanism operating said drawing means to cause said images to be recorded on successive film-frames of said sensitized film; coding means for altering the mode of said images as recorded on said exposure area; apparatus synchronized with said driving mechanism for developing a coding schedule independent of the images from said source means; means including a key-signal generator responsive to said coding schedule for actuating said coding means; and means for recording said key signal.

2. Apparatus for recording images on a sensitized film strip in coded form comprising: a film gate defining an exposure area of said sensitized film; means for drawing said sensitized film strip across said film gate; optical means for projecting images from image source means onto said exposure area; a driving mechanism operating said drawing means to cause said images to be recorded on successive film-frames of said sensitized film; coding means included in said optical means for changing the mode of said images as recorded on said exposure area; apparatus synchronized with said driving mechanism for developing a coding signal independent of the images from said source means; means including a key-signal generator responsive to said coding schedule for actuating said coding means; and means for recording said key signal.

3. Apparatus for recording images on a sensitized film strip in coded form comprising: a film gate defining an exposure area of said sensitized film; means for drawing said sensitized film strip across said film gate; an optical system for projecting images from an image source onto said exposure area; a driving mechanism operating said drawing means to cause said images to be recorded on successive film-frames of said sensitized film; a movable member included in said optical system for changing the position of said images within said exposure area; apparatus synchronized with said driving mechanism for developing a coding schedule independent of the images from said source; means including a key-signal generator responsive to said coding schedule for actuating said movable member; and means for recording said key signal.

4. Apparatus for recording images on a sensitized film strip in coded form comprising: a film gate defining an exposure area of said sensitized film; means for drawing said sensitized film strip across said film gate; an optical system for projecting images from an image source onto said exposure area; a driving mechanism operating said drawing means to cause said images to be recorded on successive film-frames of said sensitized film; a movable member included in said optical system for changing the position of said images within said exposure area; a solenoid for actuating said movable member from a first to a second position; apparatus synchronized with said driving mechanism for developing a coding schedule independent of the images from said source; means including a key-signal generator responsive to said coding signal for energizing said solenoid; and means for recording said key signal.

5. Apparatus for recording images on a sensitized film strip in coded form comprising: a film gate defining an exposure area of said sensitized film; means for drawing said sensitized film strip across said film gate; optical means for projecting images from image source means onto said exposure area; a driving mechanism operating said drawing means to cause said images to be recorded on successive film-frames of said sensitized film; coding means responsive to an applied signal for altering the mode of said images as recorded on said exposure area; a key-signal generator for developing a key signal; means synchronized with said driving mechanism for controlling the operation of said key-signal generator in accordance with a coding schedule independent of the images from said source; means including said key-signal generator and responsive to said coding schedule for actuating said coding means; and means for recording said key signal.

6. Apparatus for recording images on a sensitized film strip in coded form and for also recording key-signal markings on an edge portion of said sensitized film comprising: a film gate defining an exposure area of said sensitized film; means for drawing said sensitized film strip across said film gate; optical means for projecting images from image source means onto said exposure area; a driving mechanism operating said drawing means to cause said images to be recorded on successive film-frames of said sensitized film; coding means for altering the mode of said images as recorded on said exposure area; a light source for producing light rays; means for projecting said light rays onto said edge portion of said sensitized portion; a key-signal generator for developing a key signal; means synchronized with said driving mechanism for controlling the operation of said key-signal generator in accordance with a coding schedule independent of the images from said source means; and means including said key-signal generator and responsive to said coding schedule for actuating said coding means and controlling the intensity of said light rays in accordance with said key signal.

7. Apparatus for recording images on a sensitized film strip in coded form comprising: a film gate defining an exposure area of said sensitized film; means for drawing said sensitized film strip across said film gate; an optical system for projecting onto said exposure area images recorded in uncoded form on a developed film strip;

a driving mechanism operating said drawing means to cause said images to be recorded on successive film-frames of said sensitized film; coding means for altering the mode of said images projected onto said exposure area; apparatus synchronized with said driving mechanism for developing a coding schedule independent of the images on said developed film strip; means including a key-signal generator responsive to said coding schedule for actuating said coding means; and means for recording said key signal.

8. Apparatus for recording images on a sensitized film strip in coded form comprising: a film gate defining an exposure area of said sensitized film; means for drawing said sensitized film strip across said film gate; an optical system for projecting onto said exposure area images recorded in uncoded form on a developed film strip; a driving mechanism operating said drawing means to cause said images to be recorded on successive film-frames of said sensitized film; coding means included in said optical system for altering the mode of said images projected onto said exposure area; apparatus synchronized with said driving mechanism for developing a coding schedule independent of the images on said developed film strip; means including a key-signal generator responsive to said coding schedule for actuating said coding means; and means for recording said key signal.

9. Apparatus for recording images on a sensitized film strip in coded form comprising: a film gate defining an exposure area of said sensitized film; means for drawing said sensitized film strip across said film gate; an optical system defining an optical path from an image source to said exposure area for projecting onto said exposure area images recorded in uncoded form on a developed film strip forming said image source; a driving mechanism operating said drawing means to cause said images to be recorded on successive film-frames of said sensitized film; a refractive plate pivotally supported across said optical path of said optical system for changing the position of said images within said exposure area; apparatus synchronized with said driving mechanism for developing a coding schedule independent of the images on said developed film strip; means including a key-signal generator responsive to said coding schedule for actuating said refractive plate; and means for recording said key signal.

10. Apparatus for recording images on a sensitized film strip in coded form comprising: a film gate defining an exposure area of said sensitized film; means for drawing said sensitized film strip across said film gate; an optical system defining an optical path from an image source to said exposure area for projecting onto said exposure area images recorded in uncoded form on a developed film strip forming said image source; a driving mechanism operating said drawing means to cause said images to be recorded on successive film-frames of said sensitized film; coding means disposed in said optical path of said optical system and including a crystal for polarizing light rays representing said projected images and for separating said light rays into two paths directed to said exposure area, a pair of Kerr cells disposed in said respective paths, and a pair of polarizing crystals also disposed in said respective paths; apparatus synchronized with said driving mechanism for developing a coding schedule independent of the images from said source; means including a key-signal generator responsive to said coding schedule for supplying potential pulses to said Kerr cells to cause said coding means alternately to unblock said respective paths thereby changing the position of said images as recorded on said exposure area; and means for recording said key signal.

11. Apparatus for recording images on a sensitized film strip in coded form comprising: a film gate defining an exposure area of said sensitized film; means for drawing said sensitized film strip across said film gate; a first optical system for projecting onto said exposure area images recorded in a first mode on a first developed film strip; a second optical system for projecting onto said exposure area images recorded in a second mode on a second developed film strip; a driving mechanism operating said drawing means to cause said images from said first and second film strips to be recorded on successive film-frames of said sensitized film; coding means for alternately allowing said images from said first and second film strips to be projected onto said exposure area; means synchronized with said driving mechanism for developing a coding schedule independent of the images from said source; means including a key-signal generator responsive to said coding schedule for actuating said coding means; and means for recording said key signal.

12. Apparatus for recording images on a sensitized film strip in coded form comprising: a film gate defining an exposure area of said sensitized film; means for drawing said sensitized film strip across said film gate; a first optical system defining a first light path from a first image source to said exposure area for projecting onto said exposure area images recorded in a first mode on a first developed film strip forming said first image source; a second optical system defining a second light path from a second image source to said exposure area for projecting onto said exposure area images recorded in a second node on a second developed film strip forming said second image source; a driving mechanism operating said drawing means to cause said images from said first and second film strips to be recorded on successive film-frames of said sensitized film; shutter means disposed in said first and second light paths of said first and second optical systems for alternately allowing said images from said first and second film strips to be projected onto said exposure area; means synchronized with said driving mechanism for developing a coding schedule independent of the images from said sources; means including a key-signal generator responsive to said coding schedule for actuating said shutter means; and means for recording said key signal.

ALEXANDER ELLETT.

REFERENCES CITED

The following references are of record in the file of this patent:

UNITED STATES PATENTS

| Number | Name | Date |
|---|---|---|
| 1,494,795 | Muller | May 20, 1924 |
| 1,963,438 | Greensfelder | June 19, 1934 |
| 2,146,135 | Adams | Feb. 7, 1939 |
| 2,233,441 | Whittaker | Mar. 4, 1941 |
| 2,365,212 | Oriol | Dec. 19, 1944 |

FOREIGN PATENTS

| Number | Country | Date |
|---|---|---|
| 385,987 | Germany | Dec. 18, 1923 |